United States Patent
Aichelen et al.

(10) Patent No.: US 8,495,415 B2
(45) Date of Patent: Jul. 23, 2013

(54) METHOD AND SYSTEM FOR MAINTAINING BACKUP COPIES OF FIRMWARE

(75) Inventors: Tyky Aichelen, Los Altos, CA (US); Maria A. Rizk, Apex, NC (US); Deepa Srinivasan, Cary, NC (US); Ileana Vila, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1909 days.

(21) Appl. No.: 11/383,000

(22) Filed: May 12, 2006

(65) Prior Publication Data

US 2007/0294575 A1     Dec. 20, 2007

(51) Int. Cl.
*G06F 11/00*     (2006.01)

(52) U.S. Cl.
USPC .......................................... 714/6.1; 714/6.11

(58) Field of Classification Search
USPC ................................ 717/168; 714/6, 6.1, 6.11
See application file for complete search history.

(56) References Cited

U.S. PATENT DOCUMENTS

| | | | |
|---|---|---|---|
| 6,594,775 B1 | 7/2003 | Fair | 714/4 |
| 6,651,188 B2 | 11/2003 | Harding et al. | 714/38 |
| 2003/0163753 A1 | 8/2003 | Lu et al. | 714/2 |
| 2004/0003226 A1 | 1/2004 | Collins et al. | 713/2 |
| 2004/0205779 A1 | 10/2004 | Almeida et al. | 719/321 |
| 2004/0230788 A1 | 11/2004 | Zimmer et al. | 713/2 |
| 2004/0243798 A1 | 12/2004 | Goud et al. | 713/100 |
| 2005/0132351 A1* | 6/2005 | Randall et al. | 717/168 |

* cited by examiner

*Primary Examiner* — Scott Baderman
*Assistant Examiner* — Jigar Patel
(74) *Attorney, Agent, or Firm* — Cynthia G. Seal; Jeffrey L. Streets

(57) ABSTRACT

A method and system for maintaining backup copies of firmware. More particularly, embodiments of the present invention provide a method that includes monitoring an execution of at least one firmware component, and causing a backup copy of the at least one firmware component to be generated if the at least one firmware component executes at a predefined standard of reliability for a predefined time period. According to the system and method disclosed herein, trustworthy backup copies are available if a given server of a multiserver system fails.

10 Claims, 5 Drawing Sheets

METHOD AND SYSTEM FOR MAINTAINING BACKUP COPIES OF FIRMWARE

FIELD OF THE INVENTION

The present invention relates to computer systems, and more particularly to a method and system for maintaining backup copies of firmware.

BACKGROUND OF THE INVENTION

Blade server systems are well known. A blade server system typically includes multiple servers, or "blades," where each blade typically includes a processor, memory, storage, network connections, etc. A problem with conventional blade server systems is that individual blades may fail over time. One conventional solution is to design blades so that they are hot-swappable. As such, a failed blade may be swapped with a new blade. Furthermore, automatic backup and recovery systems are well known to assist in the event of a catastrophic failure of a blade or the firmware of a blade.

A problem with conventional automatic backup and recovery systems is that the backup copy of any firmware of a given blade is typically the same version of code that was shipped with (i.e., originally installed on) the blade. Consequently, if a blade server system were to catastrophically fail, the backup copy of the firmware may be outdated. Unfortunately, there is no known solution that validates that the backup firmware of a given hardware device is useful. This is because updated versions of firmware are typically not backed up. Furthermore, there are no mechanisms in place to track the trustworthiness of the firmware installed on a given blade.

Accordingly, what is needed is a method and system for maintaining backup copies of firmware. The present invention addresses such a need.

SUMMARY OF THE INVENTION

A method and system for maintaining backup copies of firmware is disclosed. More particularly, embodiments of the present invention provide a method that includes monitoring an execution of at least one firmware component, and causing a backup copy of the at least one firmware component to be generated if the at least one firmware component executes at a predefined standard of reliability for a predefined time period. According to the method and system disclosed herein, a trustworthy backup copy of the at least one firmware component is available if a given server of multiserver system fails.

DETAILED DESCRIPTION OF THE INVENTION

The present invention relates to computer systems, and more particularly to a method and system for maintaining backup copies of firmware. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for maintaining backup copies of firmware are disclosed. In accordance with the present invention, after a management module of a multiserver system receives a notification that a firmware component of a server has been updated, the management module monitors the execution of the updated firmware component. If the updated firmware component executes at a predefined standard of reliability for a predefined time period (e.g., one week), the management module instructs the server or notifies a user such as a system administrator to generate a backup copy of the updated firmware component. A predefined standard of reliability may be determined at the time the firmware component is developed and may depend on what is deemed reliable by a firmware developer or engineer. As a result, a trustworthy backup copy of the updated firmware component is available in case the server fails. To more particularly describe the features of the present invention, refer now to the following description in conjunction with the accompanying figures.

Although the present invention disclosed herein is described in the context of a blade server system, the present invention may apply to other types of multiserver systems, and still remain within the spirit and scope of the present invention.

Figure 1:
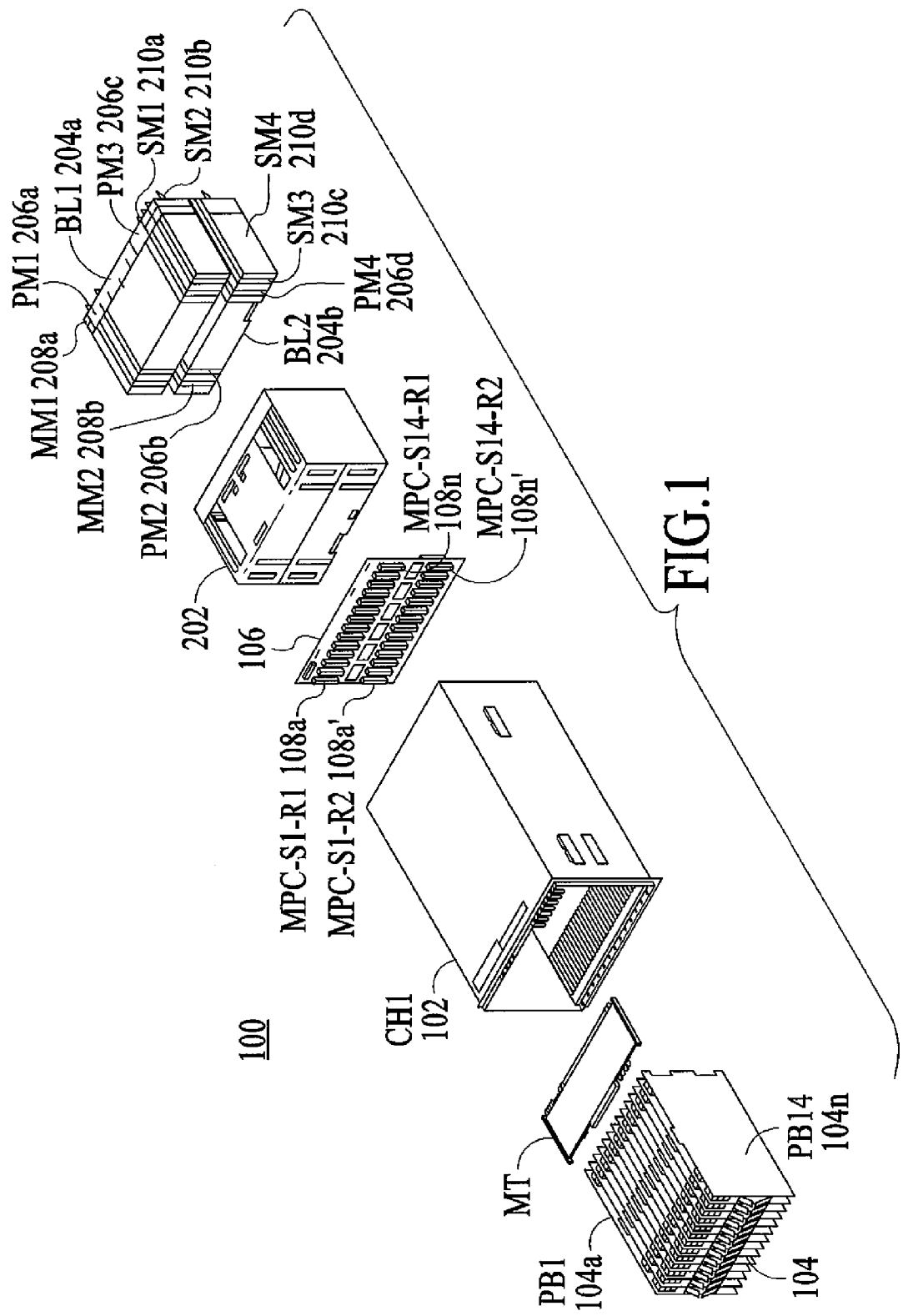
FIG. 1 is an exploded perspective-view diagram of a multiserver system in accordance with the present invention.

FIG. 1 is an exploded perspective-view diagram of a multiserver system 100 in accordance with the present invention. As FIG. 1 illustrates, a main chassis 102 houses all the components of the system 100. In one embodiment, the system 100 is a blade server system (e.g., a BladeCenter system). Up to 14 server blades 104 (also referred to herein as servers, storage servers, or storage blades) are plugged into the 14 slots in the front of chassis 102. Some of the blades 104 may be "hot swapped" without affecting the operation of other blades 104 in the system 100. A server blade 104a can use any microprocessor technology so long as it is compliant with the mechanical and electrical interfaces, and the power and cooling requirements of the system 100.

A midplane circuit board 106 is positioned approximately in the middle of chassis 102 and includes two rows of connectors 108 and 108'. Each one of the 14 slots includes one pair of midplane connectors, e.g., 108a and 108a', located one above the other, and each pair of midplane connectors, e.g., 108a and 108a' mates to a pair of connectors (not shown) at the rear edge of each server blade 104a.

Figure 2:
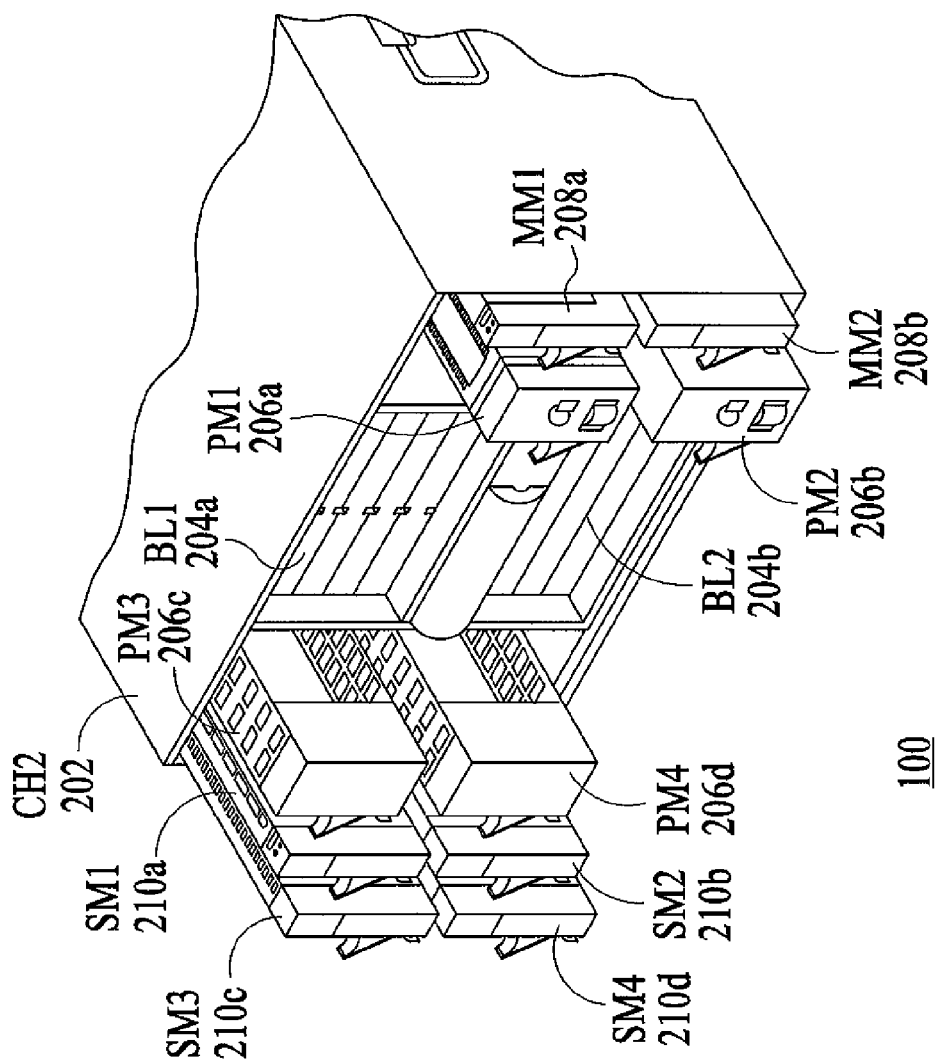
FIG. 2 is an exploded perspective-view diagram of the rear portion of the multiserver system of FIG. 1, in accordance with the present invention.

FIG. 2 is an exploded perspective-view diagram of the rear portion of the multiserver system of FIG. 1, in accordance with the present invention, whereby similar components are identified with similar reference numerals. Referring to both FIGS. 1 and 2 together, a second chassis 202 also houses various components for cooling, power, management and switching. The second chassis 202 slides and latches into the rear of main chassis 102.

As is shown in FIGS. 1 and 2, two optionally hot-plugable blowers 204a and 204b provide cooling to the blade system components. Four optionally hot-plugable power modules 206 provide power for the server blades and other components. One or more management modules MM1 and MM2

(208a and 208b) can be hot-plugable components that provide basic management functions such as controlling, monitoring, alerting, restarting and diagnostics. Management modules 208 also provide other functions required to manage shared resources, such as multiplexing the keyboard/video/mouse (KVM) to provide a local console for the individual blade servers 104, configuring the system 100, and switching modules 210, each of which is also referred to as a switch 210.

The management modules 208 communicate with all of the key components of the system 100 including the switch 210, power 206, and blower 204 modules as well as the blade servers 104 themselves. The management modules 208 detect the presence, absence, and condition of each of these components. When the management modules are installed, a first module, e.g., MM1 (208a), will assume the active management role, while the second module MM2 (208b) will serve as a standby module.

The second chassis 202 also houses up to four switching modules SM1 through SM4 (210a-210d). The primary purpose of the switch module is to provide interconnectivity between the server blades (104a-104n), management modules (208a and 208b) and the outside network infrastructure (not shown). Depending on the application, the external interfaces may be configured to meet a variety of requirements for bandwidth and function.

Although this embodiment of the present invention is described in the context of a specific number of component types (e.g., up to 14 server blades, 2 blowers, 4 power modules, 2 management modules, 4 switching modules, etc.), the present invention may apply to any number of server blades, blowers, power modules, management modules, switching modules, etc., and still remain within the spirit and scope of the present invention.

Figure 3:
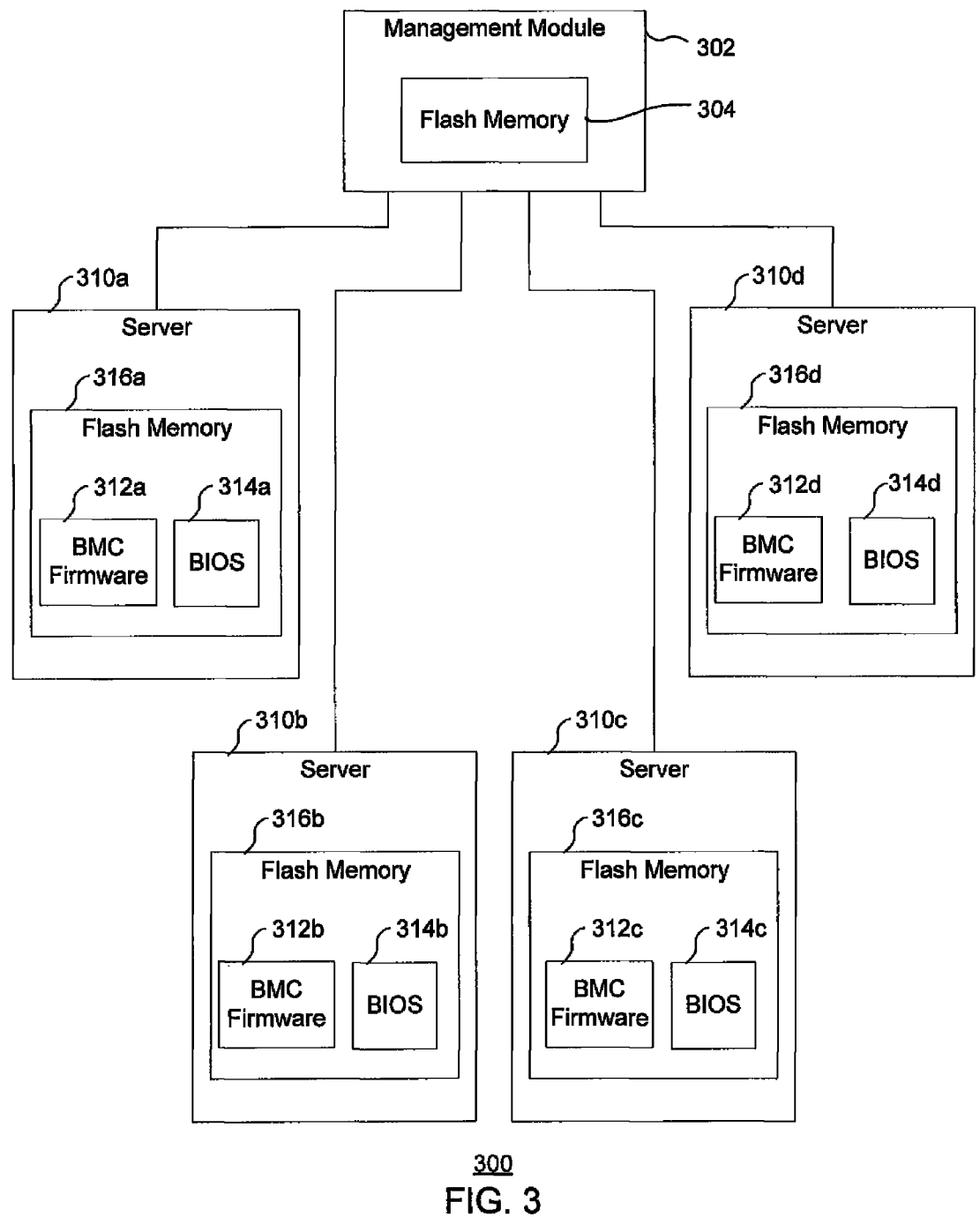
FIG. 3 is a block diagram of a management subsystem of a multiserver system in accordance with the present invention.

FIG. 3 is a block diagram of a management subsystem of a multiserver system 300 in accordance with the present invention. FIG. 3 includes one or more management modules 302, each having one or more flash memory devices 304, one or more servers 310a-310d, each having base board management controller (BMC) firmware 312a-d, a BIOS 314a-d stored on one or more flash memory devices 316a-d, respectively. In one embodiment the multiserver system 300 is a blade server system such as a BladeCenter system. The operation of the multiserver system 300 is described below in connection with FIGS. 4 and 5. In one embodiment, the flash memory devices 304 and 316a-d store firmware, which may be defined as "programming instructions" shipped with the hardware. Although some embodiments of the present invention are described in the context of a firmware, the present invention may also apply to software, and still remain within the spirit and scope of the present invention. For example, in one embodiment, the programming instructions stored in the flash memory device 304 may include both firmware and software.

Figure 4:
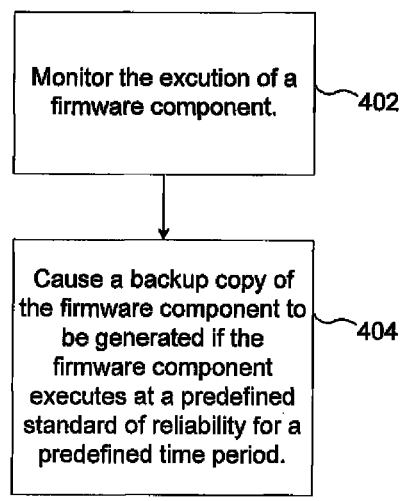
FIG. 4 is a flow chart showing a method for maintaining backup copies of firmware in accordance with the present invention.

FIG. 4 is a flow chart showing a method for maintaining backup copies of firmware in accordance with the present invention. Referring to both FIGS. 3 and 4 together, the process begins in a step 402 where the management module 302 monitors the execution of a firmware component. In one embodiment, the management module 302 may collaborate with each of the servers 310 to determine the trustworthiness of any given newly updated firmware component. In accordance with the present invention, the firmware component may be the firmware of the management module, the firmware of a BMC 312, or the BIOS 314.

In one embodiment, the predefined standard of reliability may be based on reliability measurements determined internally (i.e., at the time the firmware component is developed) by firmware developers or engineers who are familiar with the communications between the management module 302 and the servers 310. During the operation of a given firmware component, return codes may indicate firmware malfunction/corruption. For example, the management module 302 may periodically request voltage readings from the BMCs 312 of the servers 310. A given BMC firmware would not be functioning correctly, and thus could be trusted, if in response to the request, the BMC 312 returns values that are clearly out of range of the normal operating voltage ranges, but also returns the values with a "success code." This would result in an alerts or message errors indicating a significant firmware failure. In one embodiment, a backup policy may be created at the time the firmware is developed such that if a given firmware component (e.g., the BMC firmware) does not experience any significant firmware reliability failures in a predefined time period (e.g., one week, one month, etc.), the firmware component is considered "trustworthy." The predefined time period will depend on an end user/system administrator's application environment and/or system management policies. Referring again to FIG. 4, in a step 404, if the firmware component executes at the predefined standard of reliability for a predefined time period, the management module 302 causes a backup copy of the firmware component to be generated. In one embodiment, the management module 302 may be pre-configured to initiate the backup copy at the end of the time period defined in the backup policy. A given firmware component is preferably backed up automatically by its server but may alternatively be backed up by a user such as an end user or a system administrator. These backup processes are described in more detail below in connection with FIG. 5.

Figure 5:
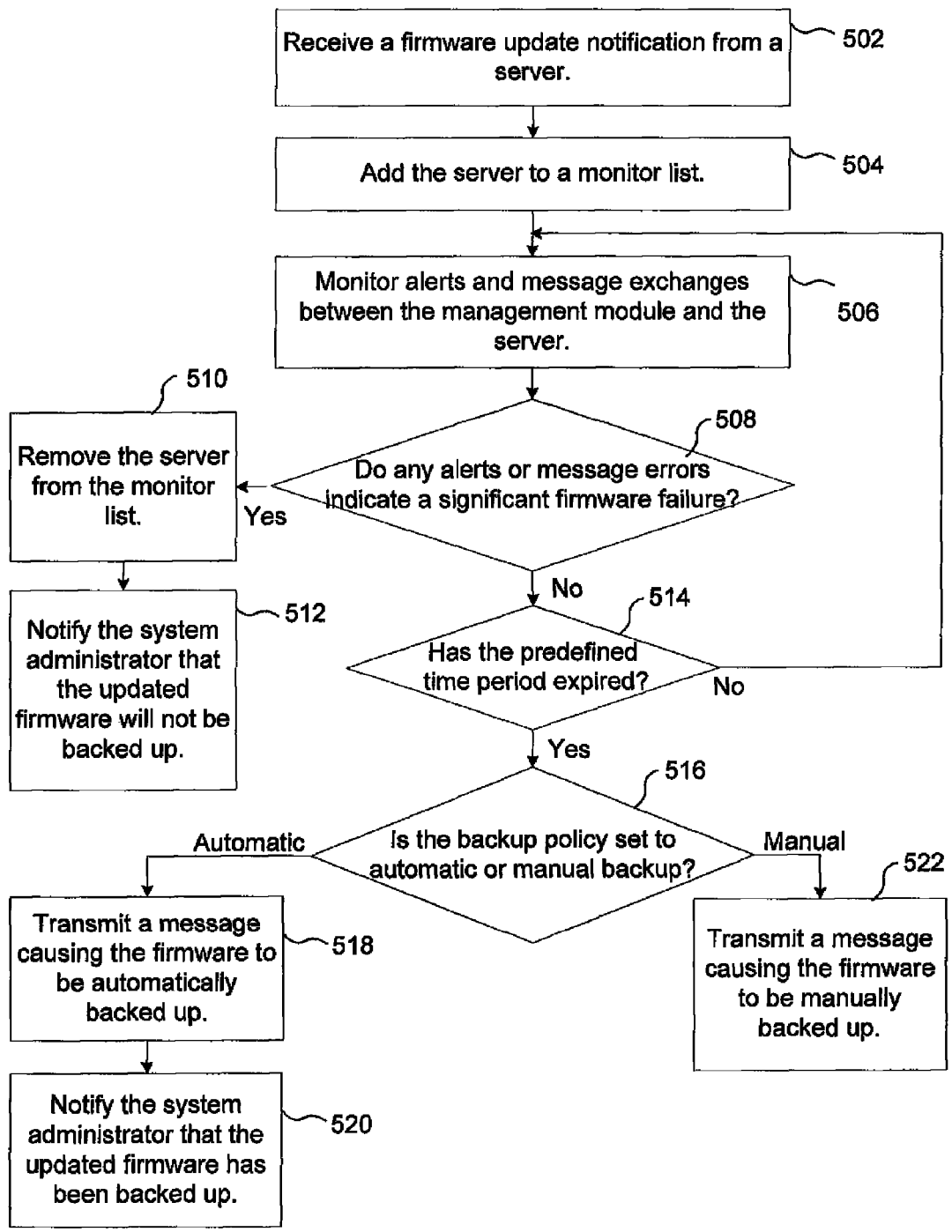
FIG. 5 is a flow chart showing a method for maintaining backup copies of firmware in accordance with another embodiment of the present invention.

FIG. 5 is a flow chart showing a method for maintaining backup copies of firmware in accordance with another embodiment of the present invention. Referring to both FIGS. 3 and 5 together, the process begins in a step 502 where the management module 302 receives a firmware update notification from a server 310. For example, the BMC firmware on a given server 310 (e.g., blade 2) may have been updated to a version 2.0, where the version in the backup copy is version 1.0. Next, in a step 504, the management module 302 adds the server 310 to a monitor list. Next, in a step 506, the management module 302 monitors alerts and message exchanges between the management module 302 and the server 310. In one embodiment, after a server 310 is inserted into the chassis of the blade server system 300, or after new BMC firmware is flashed onto the BMC 312 of the server 310, the management module 302 exchanges several messages. In addition, the management module 302 may maintain a record of certain alerts and message errors, some of which may be identified (internally) in the backup policy as critical to the determination of the trustworthiness of the BMC firmware. Next, in a step 508, the management module 302 determines whether any alerts or message errors indicate a significant firmware failure. If so, in a step 510, the management module 302 removes the server 310 from the monitor list, and then in a step 512 notifies the user (e.g., an end user or system administrator) that the firmware component will not be backed up since the monitoring has detected anomalous functioning of the firmware component. If there is no significant firmware failure, in a step 514, the management module 302 determines if the predefined time period has expired. If it has not, the management module 302 once again monitors alerts and message exchanges between the management module 302 and the server 310, in the step 506. If no alerts or message errors indicate a significant firmware failure and the management module 302 determines that the predefined time period has expired, in a step 516, the management module 302 determines whether the backup policy is set to automatic or manual backup. If the backup policy is set to automatic backup, in a step 518, the management module 302 transmits a message causing the firmware to be automatically backed up. In one embodiment, the message is transmitted to the server 310, where the message contains an instruction for the server 310 to automatically copy the main BMC firmware (which is now "trusted") to a backup area. Next, in a step 520, the management module 302 notifies the user that the firmware component has been backed up, via a management event log or any other suitable notification. If the backup policy is set to manual backup, in a step 522, the management module 302 transmits a message causing the firmware to be manually backed up. In one embodiment, the message is a notification transmitted to the user (e.g., an end user or system administrator) indicating that the firmware is trustworthy and can be manually backed up.

In one embodiment, the backup copy is preferably stored on the server 310, in the BMC 312, in the flash memory device 316, or any other suitable location on the server 310. In other embodiments, the backup copy may alternatively be stored remotely (e.g., in the management module 302 or any other suitable local or remote location). In one embodiment, the server 310 notifies the management module 302 as in the box 502, and the process repeats.

Although the specific embodiment of FIG. 5 is described in the context of updated BMC firmware, the present invention may apply to other types of firmware components, and still remain within the spirit and scope of the present invention. For example, the example described above in connection to FIG. 5 may also be applied to updated BIOS firmware or even updated firmware of the management module 302. If, for example, the BIOS firmware is updated, the process described above in connection to FIG. 5 is applied to the BIOS firmware. In one embodiment, the process may differ from that described in FIG. 5 in that the BMC 310 may monitor the execution of the updated BIOS firmware by communicating with the BIOS. The BMC 310 may also communicate with the management module to determine the predefined time period for the BIOS firmware. As such, once the predefined time period specified by the backup policy expires, if no significant alerts or error messages have been logged, the management module 302 instructs the BIOS 314 to generate a backup copy of the updated BIOS firmware and to store the backup copy in a backup location on the BIOS 314, on the flash memory device 316, or in any suitable local or remote location.

In another example, if the firmware of the management module 302 has been updated, the process described above in connection to FIG. 5 is applied to the management module firmware. In one embodiment, the process may differ from that described in FIG. 5 in that the management module 302 would not receive a firmware update notification, since the management module would already be aware of such an update. Also, the management module 302 may self-monitor the execution of its own firmware to determine its trustworthiness. For example, the management module 302 accomplishes this by exchanging messages with one or more servers 310 and monitoring alerts and message errors for a predefined time period according to the backup policy for management module firmware. As such, once the predefined time period expires, if no significant alerts or error messages have been logged, the management module 302 generates a backup copy of the updated management module firmware and stores it in the flash memory device 304, or in any suitable local or remote location.

In one embodiment, the processes for backing up the firmware of the BMC, BIOS, and management module, described above, may be integrated together into one process such that the backing up of the three firmware components may be synchronized. This would guarantee that a trusted backup environment is created. Furthermore, although embodiments of the present invention are described in the context of the three firmware components described above, the present invention may apply to other types of firmware components and any number of firmware components, and still remain within the spirit and scope of the present invention.

According to the system and method disclosed herein, the present invention provides numerous benefits. For example, embodiments of the present invention provide trustworthy backup copies of updated firmware components so that if any one or more servers of a multiserver system should fail, due to a corruption of a critical firmware component, a trustworthy and useful backup copy of the firmware component for the specific failing device is available. Embodiments of the present invention also generate backup copies of firmware components after a predefined time period to ensure that an updated firmware component is trustworthy.

A method and system for maintaining backup copies of firmware has been disclosed. In accordance with the present invention, after a management module of a multiserver system receives notification that a firmware component of a server has been updated, the management module monitors the execution of the updated firmware component. If the updated firmware component executes at a predefined standard of reliability (e.g., no significant firmware failures) for a predefined time period (e.g., one week), the management module instructs the server to generate a backup copy of the updated firmware component. As a result, a trustworthy backup copy of the updated firmware component is available in case the server fails.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for maintaining backup copies of firmware, the method comprising:
    monitoring an execution of at least one firmware component;
    causing a backup copy of the at least one firmware component to be generated if the at least one firmware component executes at a predefined standard of reliability for a predefined time period; receiving a firmware update notification from a server; and adding the server to a monitor list.

2. The method of claim 1 wherein the execution monitoring comprises:
    monitoring alerts and message exchanges between a management module and a server; and determining whether any alerts or message errors indicate a significant failure based on the predefined standard of reliability.

3. The method of claim 1 further comprising storing the backup copy of the at least one firmware component on one of a management module and a server.

4. The method of claim 1 wherein the causing comprises transmitting one of a message to a server causing the server to backup the at least one firmware component and a message to a user indicating the at least one firmware component is trustworthy and may be backed up.

5. The method of claim 1 wherein the at least one firmware component is one of a (BMC) firmware, a basic input/output system (BIOS) firmware, and a management module (MM) firmware.

6. A computer-readable storage medium containing program instructions for maintaining backup copies of firmware, the program instructions which when executed by a computer system cause the computer system to execute a method comprising:
   monitoring an execution of at least one firmware component;
   causing a backup copy of the at least one firmware component to be generated if the at least one firmware component executes at a predefined standard of reliability for a predefined time period; receiving a firmware update notification from a server; and adding the server to a monitor list.

7. The computer-readable storage medium of claim 6 wherein the execution monitoring comprises program instructions for:
   monitoring alerts and message exchanges between a management module and a server; and
   determining whether any alerts or message errors indicate a significant failure based on the predefined standard of reliability.

8. The computer-readable storage medium of claim 6 further comprising program instructions for storing the backup copy of the at least one firmware component on one of a management module and a server.

9. The computer-readable storage medium of claim 6 wherein the causing comprises program instructions for transmitting one of a message to a server causing the server to backup the at least one firmware component and a message to a user indicating the at least one firmware component is trustworthy and may be backed up.

10. The computer-readable storage medium of claim 6 wherein the at least one firmware component is one of a (BMC) firmware, a basic input/output system (BIOS) firmware, and a management module (MM) firmware.

* * * * *